United States Patent
Baccay et al.

(10) Patent No.: US 8,676,179 B2
(45) Date of Patent: Mar. 18, 2014

(54) SYSTEM AND METHOD FOR PROVIDING IDENTIFYING INFORMATION TO A MOBILE DEVICE

(75) Inventors: Peter Baccay, San Jose, CA (US);
Michael Gray, Montclair, NJ (US);
Colin Werner, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 605 days.

(21) Appl. No.: 12/394,247

(22) Filed: Feb. 27, 2009

(65) Prior Publication Data

US 2010/0222044 A1    Sep. 2, 2010

(51) Int. Cl.
*H04M 3/42* (2006.01)
(52) U.S. Cl.
USPC ...... 455/415; 455/554.1; 455/555; 455/414.1
(58) Field of Classification Search
USPC .............. 455/403, 414.1, 415, 400, 401, 462, 455/554.1, 555
See application file for complete search history.

(56) References Cited

U.S. PATENT DOCUMENTS

| | | | | |
|---|---|---|---|---|
| 5,956,652 | A * | 9/1999 | Eriksson | 455/555 |
| 6,791,975 | B1 * | 9/2004 | Aktas et al. | 370/356 |
| 2002/0106074 | A1 * | 8/2002 | Elliott | 379/372 |
| 2004/0032946 | A1 | 2/2004 | Koser et al. | |
| 2004/0266415 | A1 * | 12/2004 | Belkin et al. | 455/415 |
| 2005/0076032 | A1 | 4/2005 | Lund | |
| 2006/0128357 | A1 * | 6/2006 | Suryanarayana et al. | 455/404.2 |
| 2007/0248221 | A1 * | 10/2007 | Chatterjee et al. | 379/211.02 |
| 2007/0293205 | A1 * | 12/2007 | Henderson | 455/415 |
| 2009/0022299 | A1 * | 1/2009 | Bakshi et al. | 379/220.01 |
| 2009/0052647 | A1 * | 2/2009 | Wood et al. | 379/207.02 |

FOREIGN PATENT DOCUMENTS

| | | |
|---|---|---|
| DE | 37 42 359 A1 | 6/1989 |
| WO | 2005/039159 A1 | 4/2005 |

OTHER PUBLICATIONS

Exchange UM Connected to a PBX, http://support.microsoft.com/default.aspx/kb/940726, dated Mar. 7, 2008.
Extended European Search Report dated Sep. 29, 2009, issued by the European Patent Office in connection with corresponding European Patent Application No. 09154042.7.

(Continued)

*Primary Examiner* — Ronald Eisner
(74) *Attorney, Agent, or Firm* — Norton Rose Fulbright Canada LLP

(57) ABSTRACT

A system and method for providing identifying information about the source of an incoming communication to a mobile device is provided. An incoming communication is received by an enterprise network and a connection is established to the mobile device. A DTMF message is sent to the mobile device by the enterprise network. If the source of the incoming communication has an enterprise-assigned number then the DTMF message comprises an identifying key corresponding to the key field of a profile list comprising enterprise-assigned numbers and an identifying information entry for each enterprise-assigned number in the list. If the source of the incoming communication does not have an enterprise-assigned number, the DTMF message comprises an identifying number for the source of the incoming communication. If DTMF is not available on the mobile device, similar logic may be employed using, for example, ANI manipulation.

28 Claims, 11 Drawing Sheets

(56) References Cited

OTHER PUBLICATIONS

Canadian Intellectual Property Office, Examiner's Requisition dated Apr. 30, 2012, issued in respect of Canadian Patent Application No. 2,694,891.

Matias Erny Reichl Hoffmann, Response to European Search Report dated Nov. 27, 2009, filed in European Patent Application No. 09154042.7.

Norton Rose, Response to Examination Report dated Jul. 31, 2012, filed in Canadian Patent Application No. 2,694,891.

\* cited by examiner

SYSTEM AND METHOD FOR PROVIDING IDENTIFYING INFORMATION TO A MOBILE DEVICE

FIELD

The present application relates to generally to mobile communication devices and, more particularly, to systems and methods for providing identifying information about incoming communications to mobile devices.

BACKGROUND

Mobile communication devices, such as cellular telephones, PDAs and BlackBerry® devices are often capable of displaying identifying information about the source of an incoming communication. This provides information to the user of the mobile device which may aid the user in deciding whether to accept the communication at that time. Where the communication is received by the mobile device from the source of the communication over a single communications network, as for example over the public switched telephone network (PSTN) or over a public land mobile network (PLMN), this information may be provided, for example, using a caller ID function provided by the common communication carrier. Other communications, however, may be routed to or through a system, such as an enterprise network including a corporate private branch exchange (PBX), which is operated or controlled independently of the network on which the communication originated. In such instances special difficulties may arise in providing the targeted mobile device with identifying information concerning the source of the communication.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
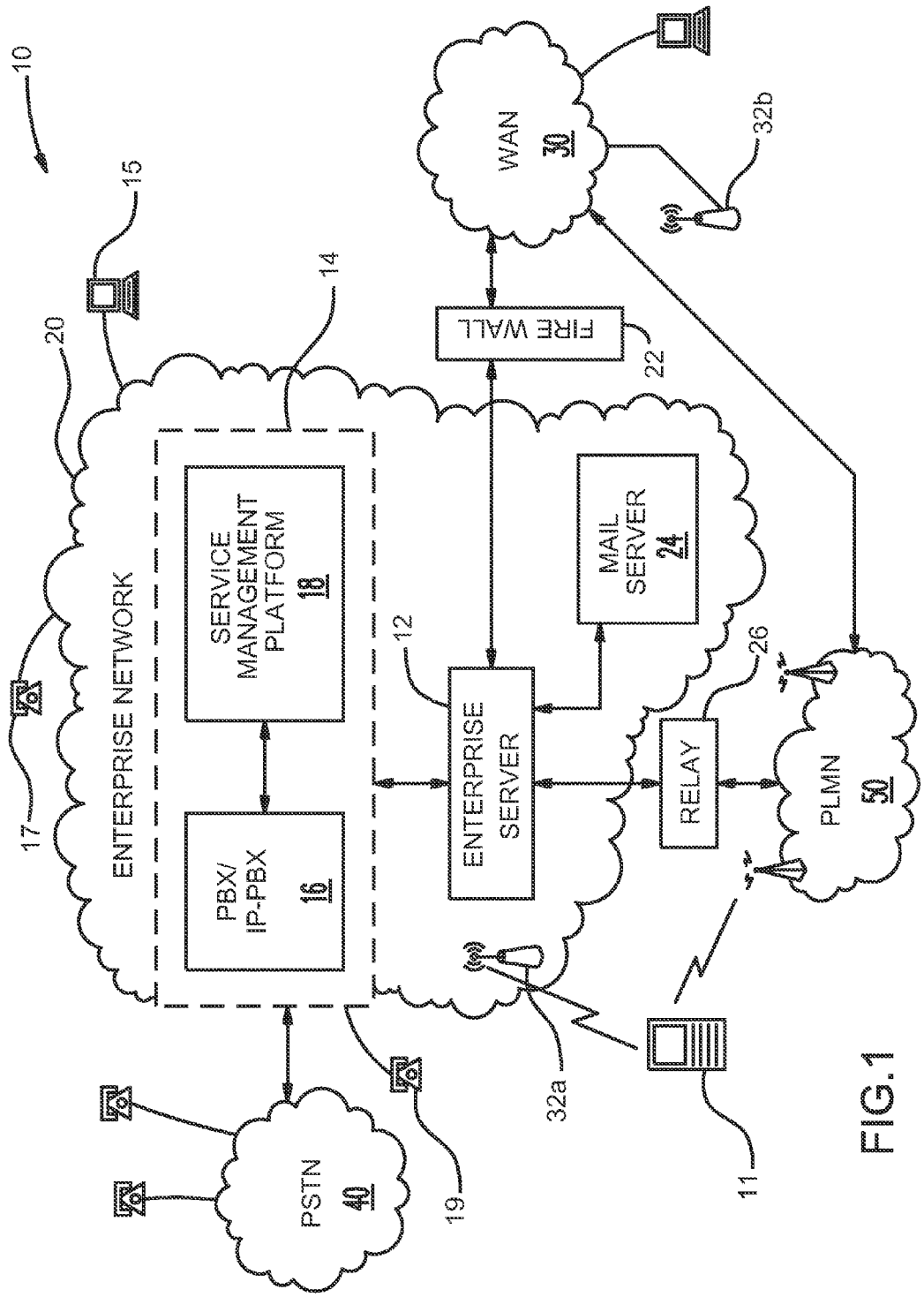
FIG. 1 shows, in block diagram form, an example system for managing enterprise-related mobile calls, including an enterprise communications platform.

In one aspect, there is provided a system for transmitting identifying information about a source of an incoming communication to a mobile device. The system has a communications platform for receiving the incoming communication and initiating a connection between the source of the incoming communication and the mobile device and a DTMF module coupled to the communications platform for generating and transmitting a DTMF message to the mobile device upon receipt of an incoming communication by the communications platform. If the source of the incoming communication has an enterprise-assigned number, the DTMF message comprises an identifying key corresponding to the key field of a profile list comprising enterprise-assigned numbers and an identifying information entry for each enterprise-assigned number in the profile list, and otherwise, the DTMF message comprises an identifying number for the source of the incoming communication.

In another aspect, there is provided a method of transmitting identifying information about a source of an incoming communication to a mobile device connected to an enterprise network. The method comprises, receiving the incoming communication at the enterprise network; initiating a connection between the source of the incoming communication and the mobile device; and generating and transmitting a DTMF message to the mobile device. If the source of the incoming communication has a enterprise-assigned number, the DTMF message comprises an identifying key corresponding to the key field of a profile list comprising enterprise-assigned numbers and an identifying information entry for each enterprise-assigned number in the profile list, and otherwise, the DTMF message comprises an identifying number for the source of the incoming communication.

In another aspect, there is provided a method of displaying identifying information about a source communication device to a user of a mobile device connected to an enterprise network. The method comprises: receiving a notification of an incoming communication from the enterprise network, the notification comprising a DTMF message; using the DTMF message to determine the identifying information of the source communication device; and displaying the identifying information on the mobile device.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi (TRADEMARK) communications over one of the WLANs 32, or dual-mode devices capable of both cellular and WLAN communications. WLANs 32 may be configured in accordance with one of the IEEE 802.11 specifications.

In some embodiments, mobile devices 11 are two-way mobile communication devices having at least voice and data communication capabilities, including the capability to communicate with other digital or analog automatic data processing systems (i.e., computers). Examples of mobile devices 11 suitable for use in implementing systems and methods disclosed herein include, depending on the functionality provided, data messaging devices, two-way pagers, cellular telephones with data messaging capabilities, wireless Internet appliances, data communication devices (with or without telephony capabilities), a clamshell device, personal digital devices (PDAs) and flip-phones.

It will be understood that the mobile devices 11 include one or more radio transceivers and associated processing hardware and software to enable wireless communications with the PLMN 50 and/or WLAN(s) 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Examples of mail servers suitable for use in implementing systems and methods disclosed herein include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
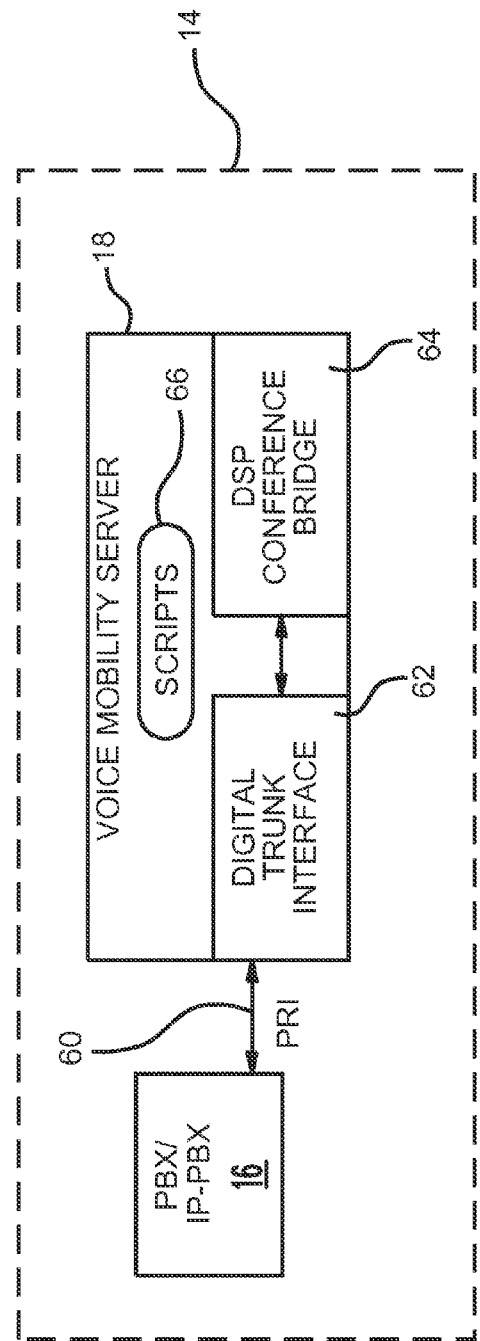
FIG. 2 shows, in block diagram form, further details of an embodiment of the enterprise communications platform.
Figure 3:
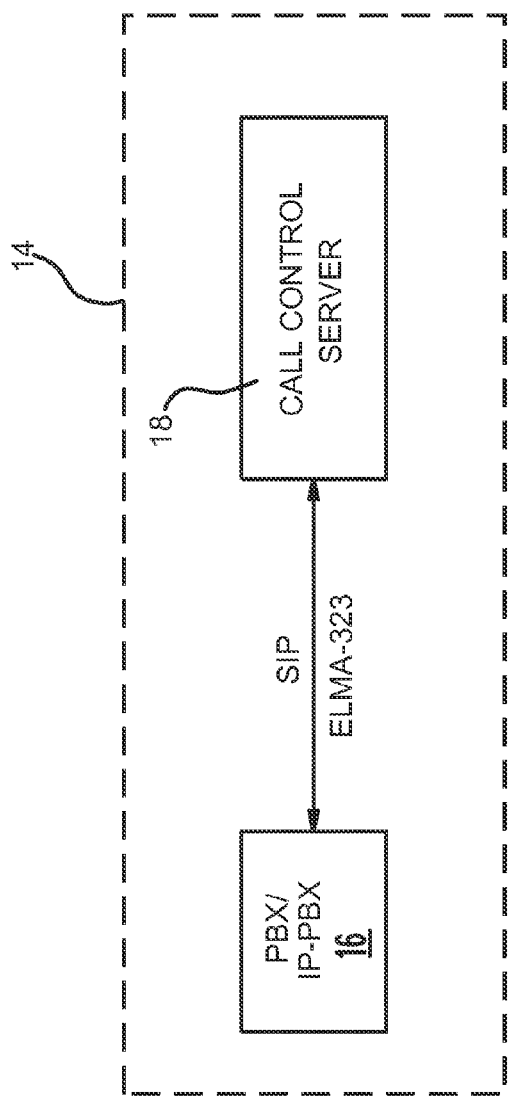
FIG. 3 shows another embodiment of the enterprise communications platform.
Figure 4:
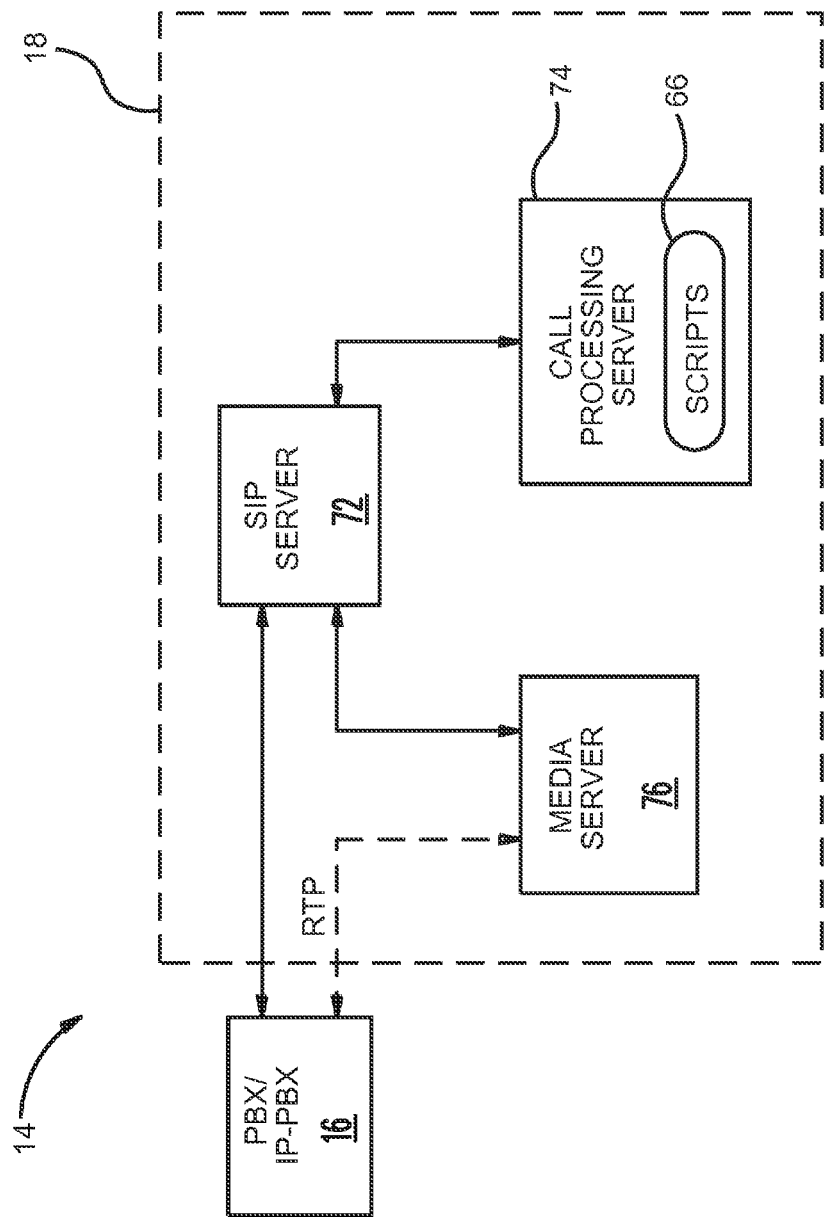
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows an embodiment of an enterprise communications system 14 in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5A:
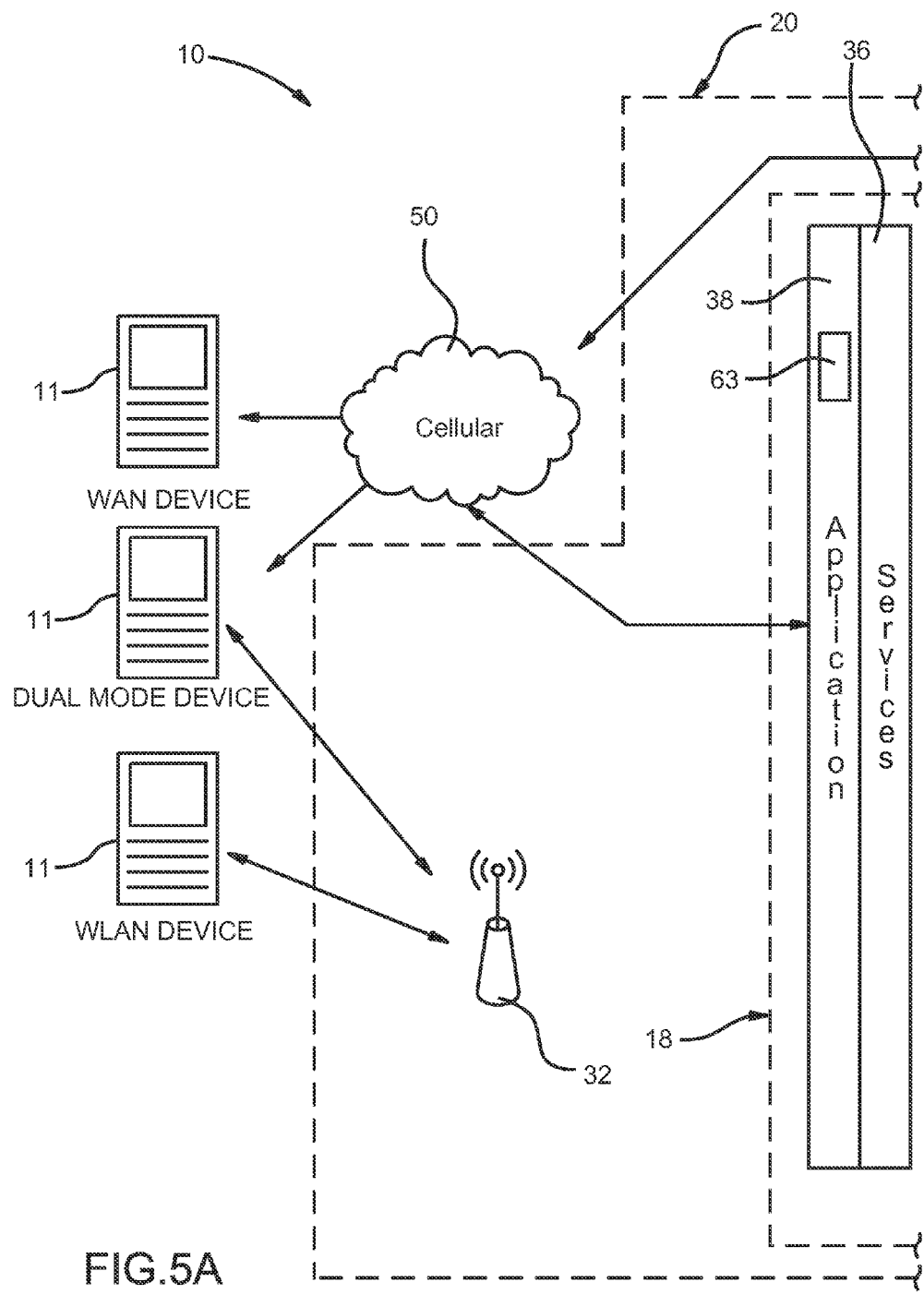
FIGS. 5A and 5B show, in block diagram form, further details of the enterprise communications platform of FIG. 3.
Figure 5B:
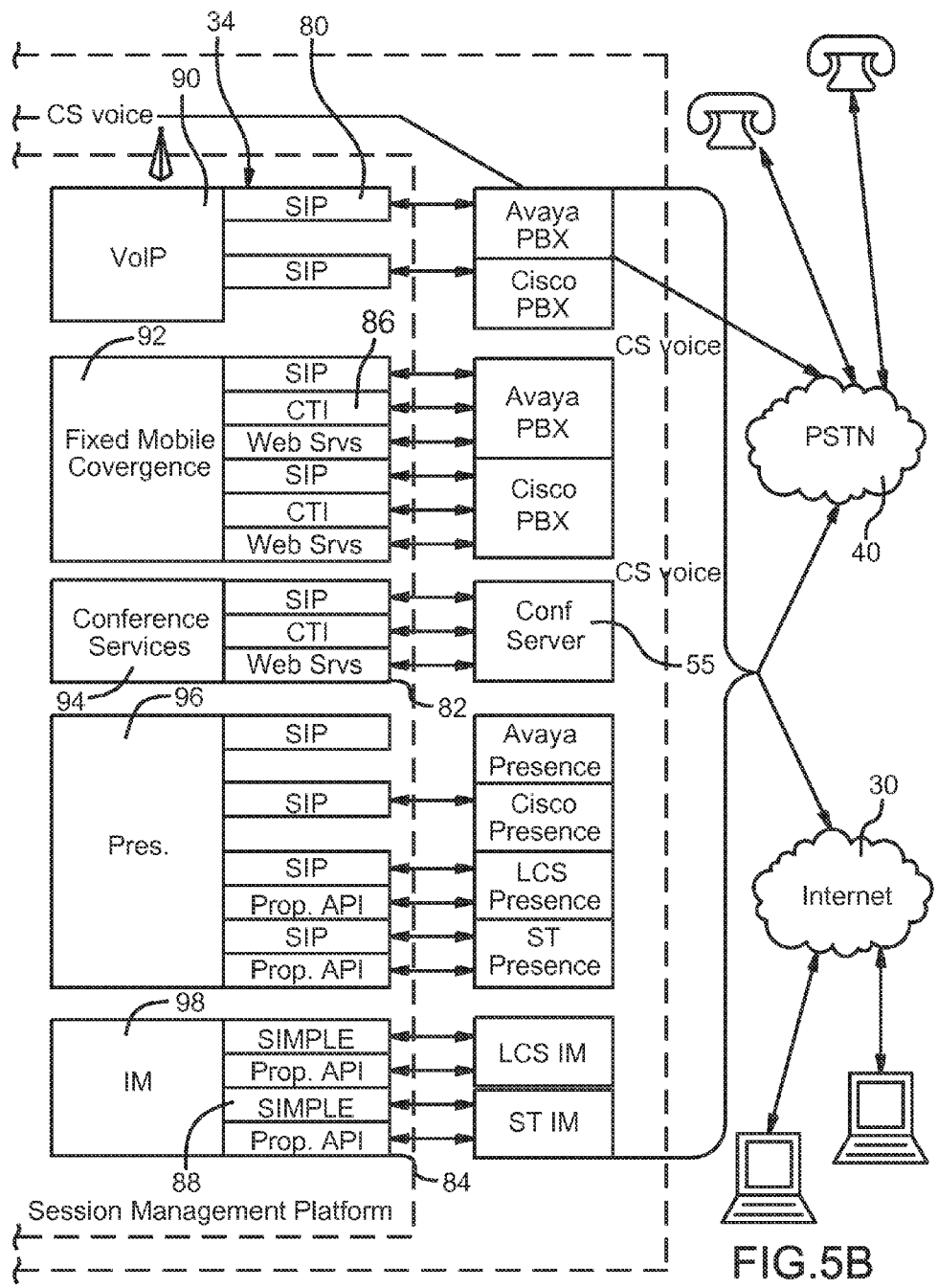

Reference is now made to FIGS. 5A and 5B, collectively referred to as FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

In the embodiment shown SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
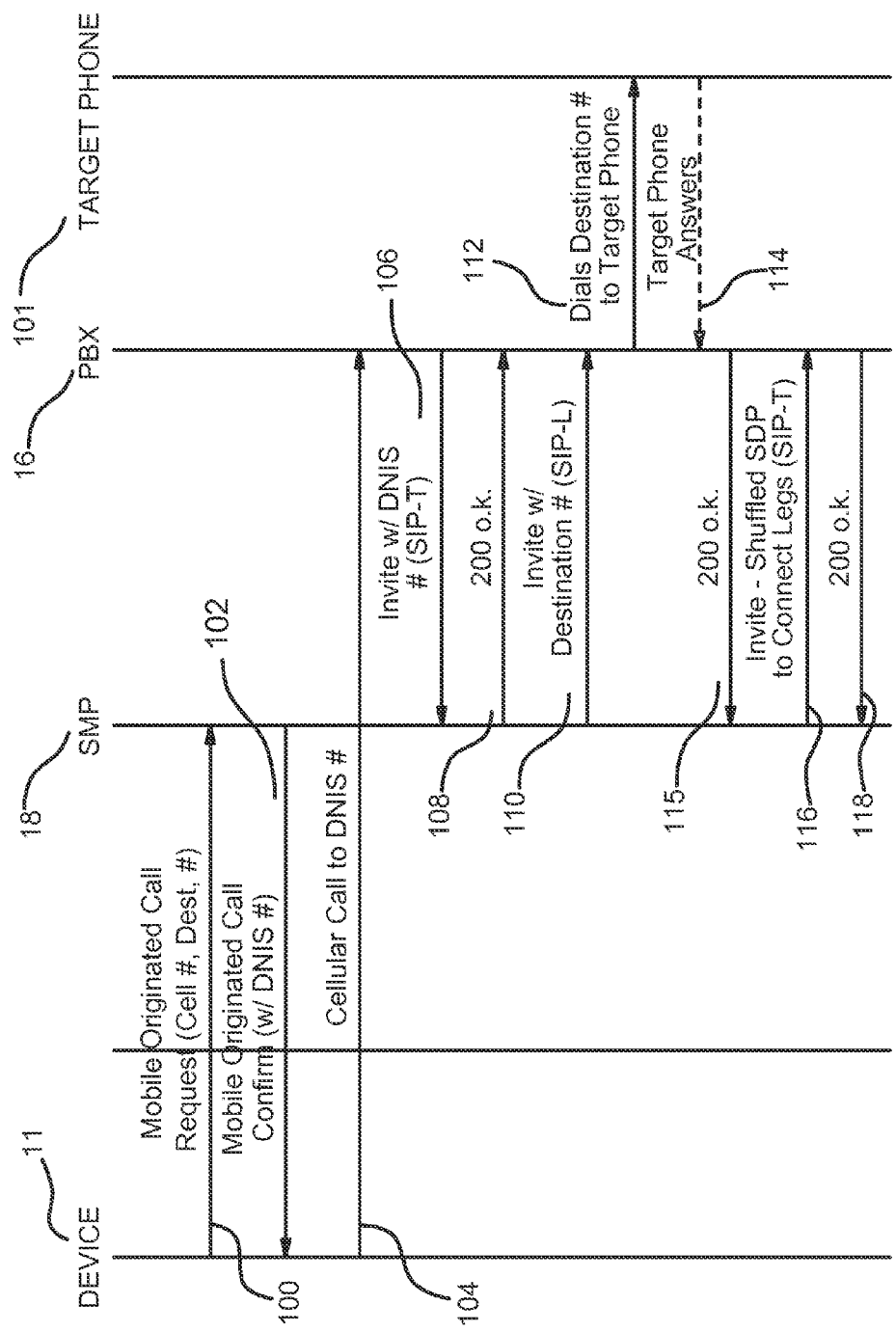
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
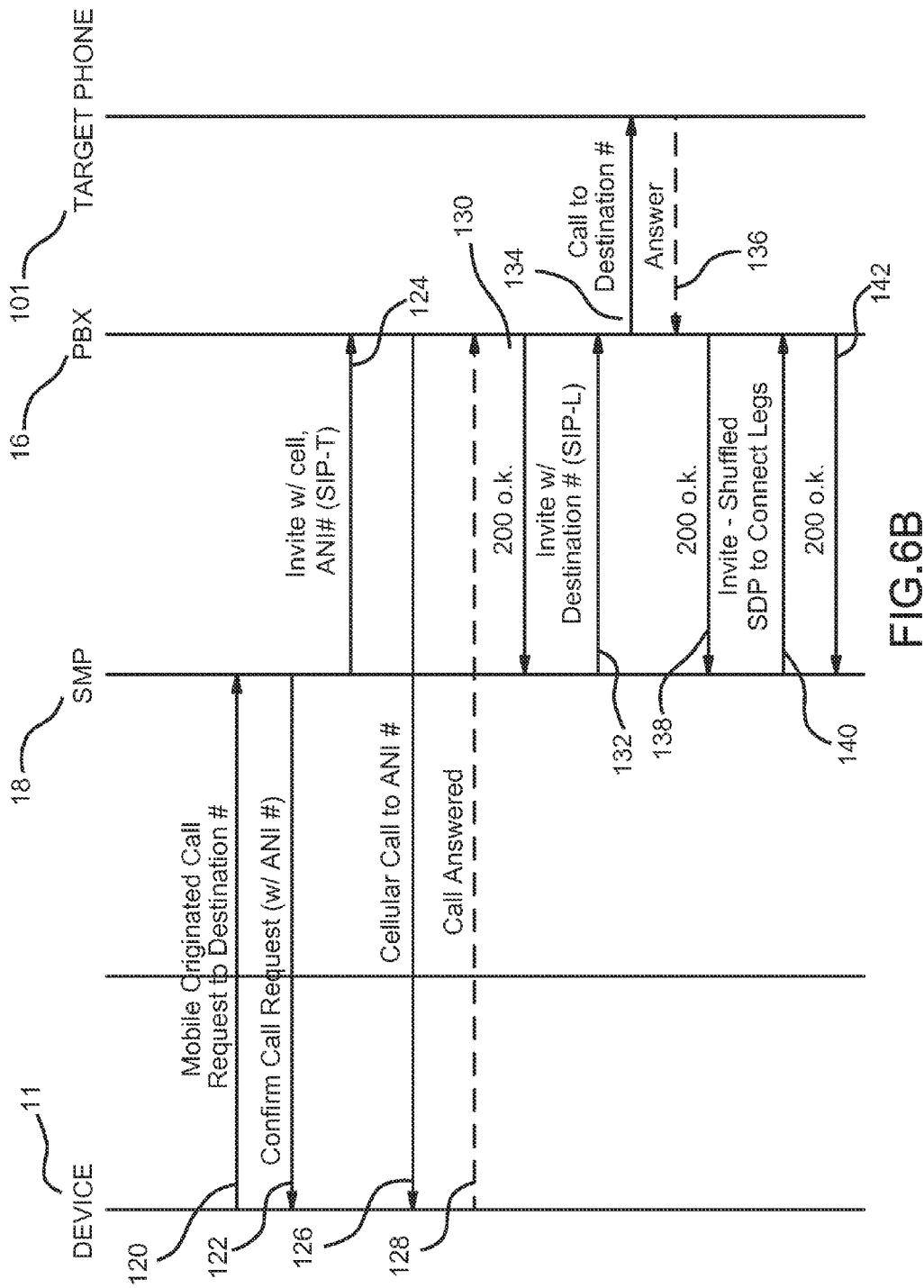
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
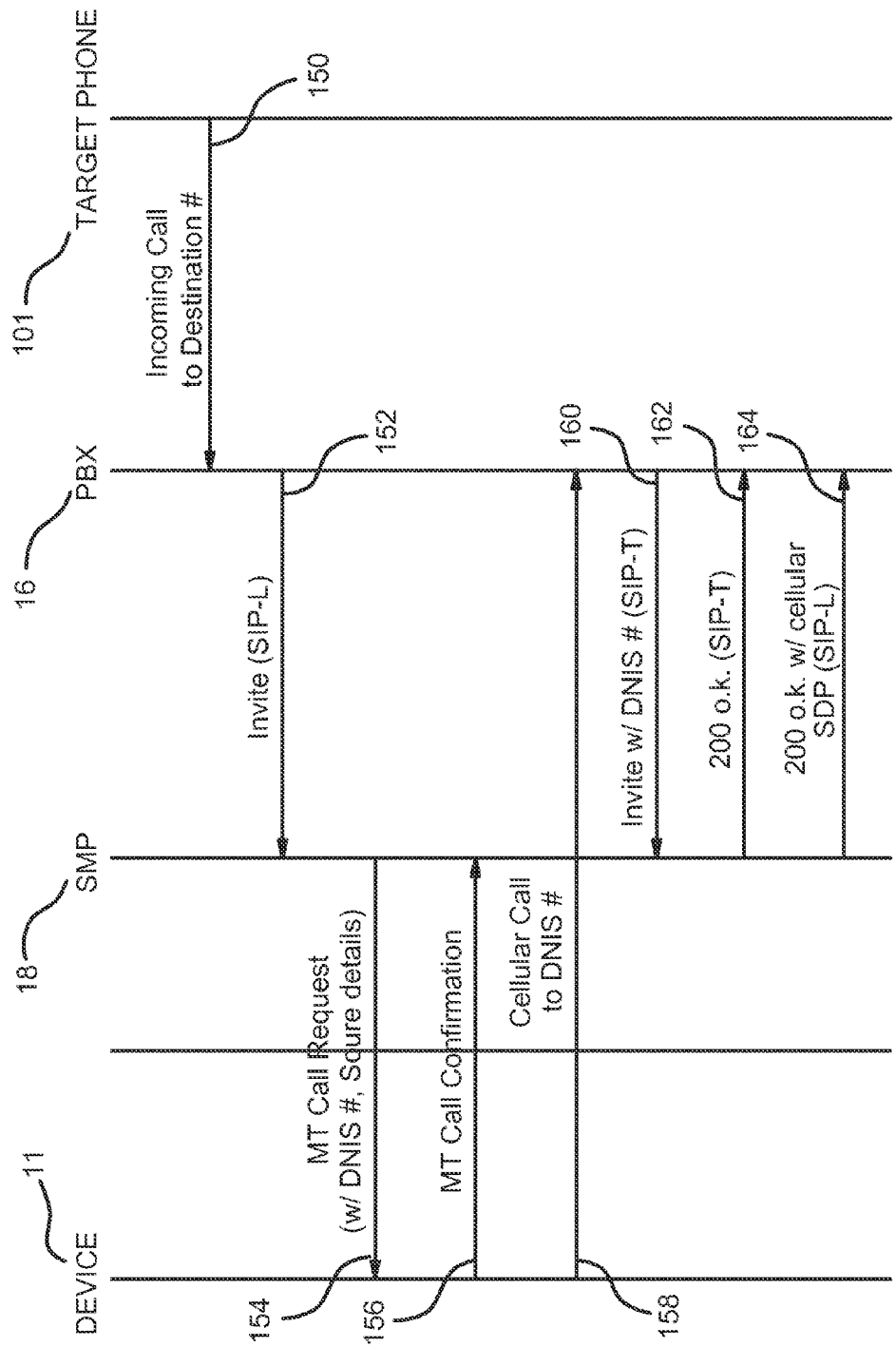
FIG. 7A is a signaling diagram generally indicating how mobile-terminated, mobile-initiated calls are processed by the network of FIG. 5.
Figure 7B:
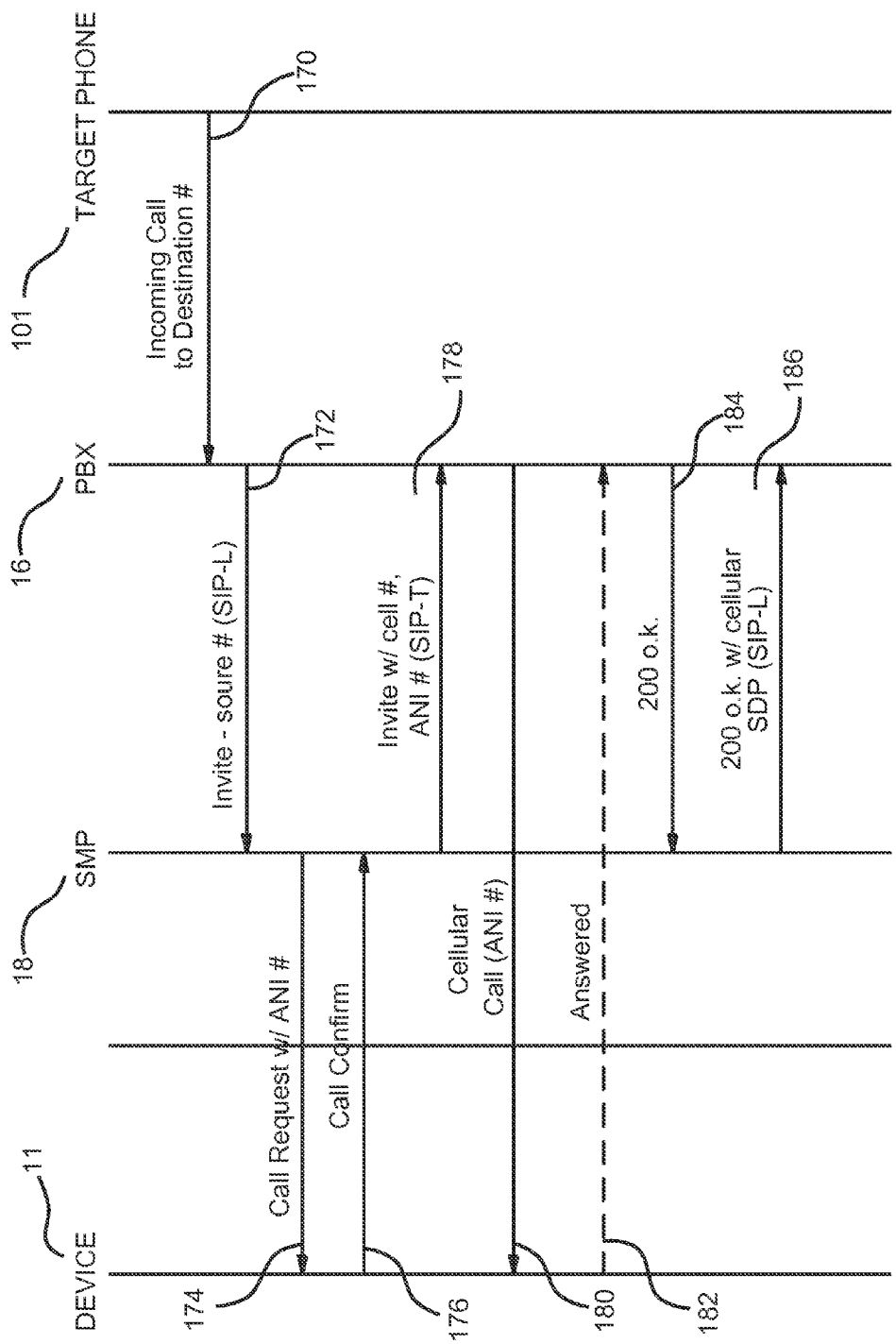
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). These source details may be sent via a data connection between the system 20 and the mobile device 11, such as that discussed further in relation to FIG. 8. In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Figure 8:
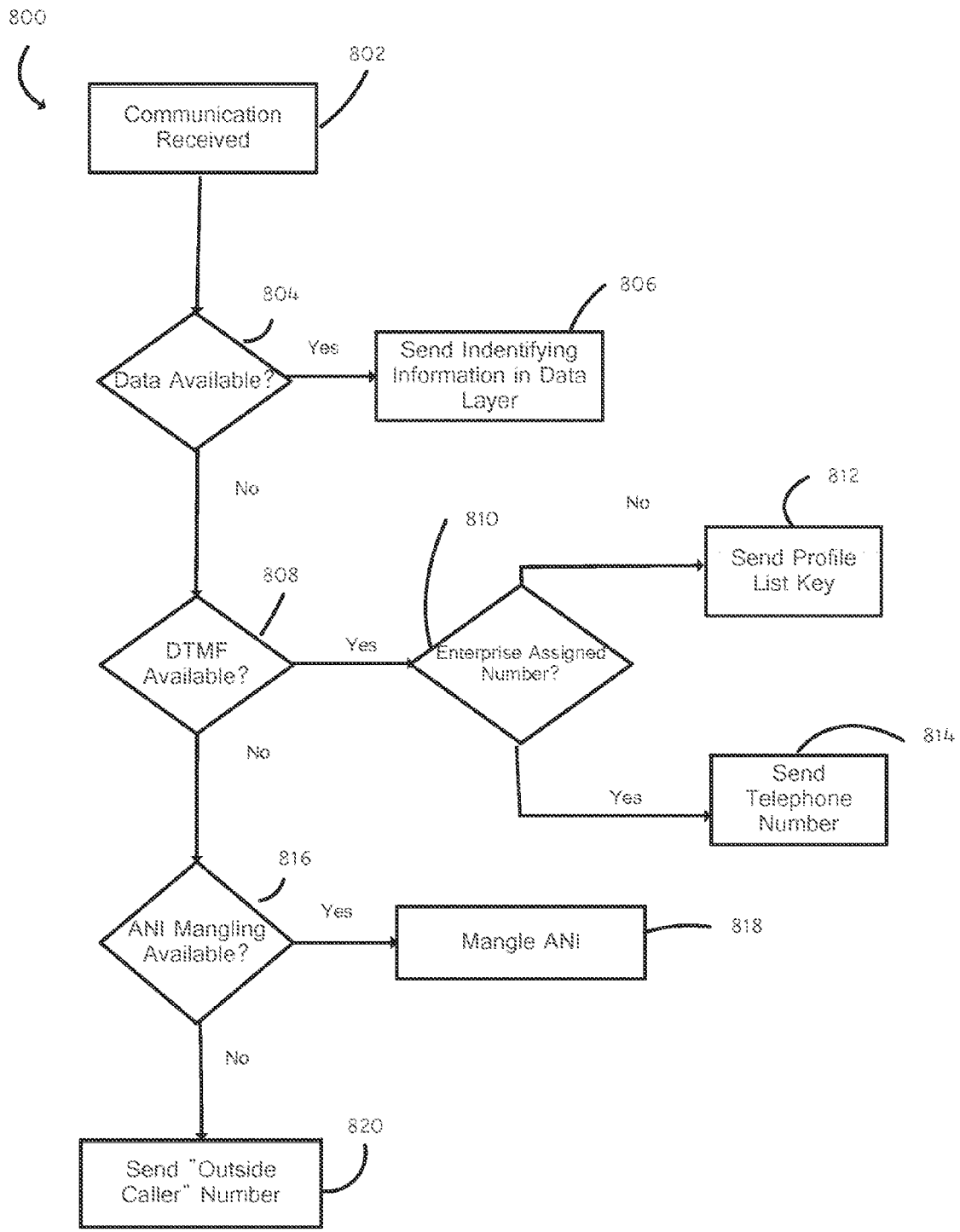
FIG. 8 shows a method of providing identifying information about a source communication to a mobile device according to an embodiment.

Reference is now made to FIG. 8, which shows an embodiment of a method 800 of providing to a mobile device 11 identifying information about a source of a communication to the mobile device. Method 800 is suitable for implementation by, for example, the enterprise server architecture shown in FIG. 1 to which reference will be made where appropriate.

At 802 in FIG. 8, a communication such as a request to initiate a call intended for a mobile device 11 is received by PBX server 16 or other device associated with enterprise network 20. This corresponds, for example, to block 150 of FIG. 7A or block 170 of FIG. 7B.

The PBX server 16 or other device receiving the incoming communication request may be capable of sending and receiving different types or layers of data to and from the mobile device 11, particularly where mobile device 11 is a dual-mode device as described above. For example, an auditory layer (or voice channel or voice service) can be used to transfer data representing voice and other auditory information to and from the mobile device 11. In some embodiments, a data layer (or data channel or data service) can be used to transfer other data, such as non-auditory data, between the enterprise network 20 and the mobile device 11. For example, sending the ANI number to the mobile device, as shown in blocks 122 and 174 of FIGS. 6B and 7B respectively, can be done using the data layer.

Identifying information about the source of an incoming communication may be transferred to a mobile device 11 from the enterprise network 11 using the data layer. For example, at block 154 of FIG. 7A, source details are sent to the mobile device 11 from the SMP 18 using the data layer. Such source details, however, can be sent via the data layer only when and where data service is available.

At 804, the system 16, 20, etc., checks to determine whether data service is available between the mobile device 11 and the enterprise network 20. If data service is available, the identifying information is sent to the mobile device using the data layer at block 806. The identifying information can then be displayed on the mobile device 11 and the communication may proceed as depicted, for example, in FIG. 7A.

In some situations, however, data service may not be available between the enterprise network 20 and the mobile device 11. This may occur, for example, when the device is roaming. Alternatively, the mobile device may be an older device or other device with which data service is never available. In such cases, the identifying information about the source of a communication can not be sent using the data layer. In other situations, it may not be desirable to use the data service between the enterprise network 20 and the mobile device 11 even where data service is available, for example, where the sending of identifying information does not easily fit into the data service protocol. Where no data service is available or the use of data service is undesirable, other techniques may be used to transfer identifying information to the mobile device 11 if this information is to be displayed on the device.

At block 808, the system determines whether dual-tone multi-frequency (DTMF) capabilities are available for the mobile device 11. If DTMF is available then a DTMF message comprising the identifying information can be generated by the enterprise network 20 and transmitted to the mobile device 11. This may be done, for example, using a DTMF module coupled to the communications platform 14 resident in a memory of the enterprise network 20 to be executed by a processor of the enterprise network 20. Dual-tone multi-frequency (DTMF) signaling is used for telephone signaling in the voice-frequency band. Hence, a DTMF message can be sent to the mobile device 11 regardless of whether or not data service is available between the enterprise network 20 and the mobile device 11. Methods of generating and receiving DTMF messages are well known in the art.

The mobile device 11 may then use information extracted from the DTMF message to identify the source of the communication. The contents of such a DTMF message may depend on any suitable factors, including for example, whether or not the source of the incoming communication is a device known to the enterprise network 20. For example, the content of the DTMF message may depend on whether or not the assigned telephone number or other address information associated with the source of the communication has been assigned or otherwise recognized by the enterprise network or its administrator(s). A device associated with an enterprise-assigned number is sometimes referred to as a participant in the enterprise network.

If the source of the incoming communication is an enterprise participant (e.g., has an enterprise-assigned or -acknowledged number) then, at block 812, the DTMF message may contain an identifying key. The identifying key may allow the mobile device 11 to look up information about the source of the communication in, for example, a profile list stored on the mobile device 11. The profile list may include a list of all participants (or a specific subset of participants) for the enterprise network 20 and may be passed to each participant device using the data layer when data service is available or through some other means. Updates to the profile list may be sent to the mobile device 11 from the enterprise network 20 periodically on a set schedule or whenever changes occur to the list. The profile list may, for example, be in the form of a spreadsheet and may comprise identifying information entries for each participant in the list including, for example, each participant's name and phone number as well as possibly other information such as a participant's location, department and internal extension. Each entry in the profile list may contain a key field. The length of the profile list may be limited by the length of the key field. In general, the length of the key field may be limited to a size which is practical to be sent using the methods discussed herein. The identifying key contained in the DTMF message may be used by the mobile device 11 to find the appropriate entry in the profile list with a matching key field. Some or all of the information from the appropriate entry in the profile list may then be displayed on the mobile device 11. An advantage of the use of such identifying keys is economy and efficiency in the tracking and forwarding of data representing identifying information associated with enterprise participants. This can, for example, lead to increased communications bandwidth and other benefits.

Alternatively, identifying information for a participant can be stored in an address book or other suitably-configured data store associated with or otherwise accessible by the mobile device 11 with an optionally hidden DTMF key field and Boolean value indicating that the entry is a participant. The mobile device can in such circumstances match the identifying key from the DTMF message to the entry in the address book with a matching DTMF key and extract the identifying information to be displayed.

It will be understood by those skilled in the art that the identifying key could itself be part of the identifying information, such as the user's telephone number, or it could be another number, such as a sequential or random number, assigned specifically for this purpose. The identifying key may be updated periodically for security purposes.

If the source of the incoming communication is a non-participant (i.e. does not have an enterprise-assigned or acknowledged number), at block 814 the DTMF message may contain or otherwise represent an identifying number (such as the telephone number) or other address information, or other information identifying the source of the communication. Such information can be extracted from the DTMF message and displayed on the mobile device 11. The mobile device 11 can also display a message indicating, for example, that the source of the communication is an outside caller.

The DTMF message may also include a security key used by the mobile device 11 to confirm that the DTMF message originates from the enterprise network 20. For example, the enterprise network 20 can maintain a database or other machine-readable store of security numbers (or other information) which it may permit mobile device 11 to access though the data layer when data service is available or through some other means. Such a store of numbers or other identifiers may be changed or updated periodically, or otherwise as appropriate or desired. When a DTMF message is sent to a mobile device 11, the message may include such a security identifier. The mobile device 11 can extract the security identifier and check it against the security identifiers accessible by it via enterprise network 20. If the security identifier in the message does not appear on the list maintained by enterprise network 20, the mobile device 11 may assume there has been a breach in security and terminate the communication. It should be noted that this is only one possible implementation of the use of security identifiers or other keys, and those of skill in the art will recognize that there may be a number of different ways in which such a security key could be implemented.

If the mobile device 11 for which a communication is intended does not support DTMF, at block 816 the system can determine whether a caller identification code, such as the automatic number identification (ANI), of the communication can be manipulated. The ANI is a feature of telephony intelligent network services that permits subscribers to display or capture the telephone numbers of calling parties. An ANI may be sent to the mobile device 11 from the enterprise network 20 when the call is initiated, for example at block 174 of FIG. 7B. Where an enterprise network 20 is used to relay a communication to a mobile device, the ANI may be manipulated in order to send information about the source of the communication to the mobile device 11 such as the number (e.g. telephone number) of the source of the communication. The manipulation of the ANI to include the number of a source communication is sometimes called ANI mangling. If ANI mangling is possible, the ANI will be manipulated at block 818.

If ANI manipulation is available then, at block 818, logic similar to that employed in blocks 810 to 814 may be utilized. In other words, if the source of the incoming communication is an enterprise assigned number then an identifying key to the profile list described above may be sent to the mobile device, as in block 812 of method 800. For example, in order for the enterprise network 20 to send an identifying key 1111 using ANI manipulation, the ANI may be the following: 992-001-1111. The first three digits, 992, could be used to identify the communication as Enterprise participant communication. The second three digits, 001, could be a security key or type of call identifier. The final four digits, 1111, could represent the identifying key to the same profile list used in DTMF logic described above.

If the source of the information is not an enterprise assigned number (non-participant) then the ANI may contain or otherwise represent an identifying number (such as the telephone number) or other address information, or other information identifying the source of the communication, as in block 814. For example, for non-participant callers, the ANI could be 993-123-456-7890 where 993 identifies call as an Enterprise communication from non participant with caller id 1234567890.

The transmission of a telephone number, as may be done in block 814, may be considered less secure than sending an identifying key, as in block 812, because the actual number of source of the incoming communication is included in the message.

In some jurisdictions, the manipulation of an ANI is not permitted where the resulting number is not a number owned by the system performing the manipulation. For instance, in these jurisdictions, a enterprise network 20 would not be permitted to manipulate the ANI to include the number of an outside (non-participant) caller. In such a case, the enterprise network 20 may set aside a number or other identifier which it does own to be used to indicate that an incoming communication is from an outside caller. The ANI can be manipulated at block 820 to include this dedicated number. When the mobile device 11 received a call indicating that the source of the communication is the dedicated number, it would recognize the number as an indication that the caller is an outside (non-participant) caller and can display a message to that effect. ANI mangling will normally be available for participant sources even in such jurisdictions because a participant source will, by definition, have a number assigned by the enterprise network 20. Hence, the number of a participant source will normally be owned by the enterprise network 20.

While the blocks of method 800 are shown as occurring in a particular order, it will be appreciated by those skilled in the art that many of the blocks are interchangeable and may occur in different orders that that shown without materially affecting the end results of the method.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

Certain adaptations and modifications of the described embodiments can be made. Therefore, the above discussed embodiments are considered to be illustrative and not restrictive.

What is claimed is:

1. A system for transmitting identifying information about a source of an incoming communication to a mobile device connected to an enterprise network, the system comprising:
   a communications platform of the enterprise network for receiving the incoming communication and initiating a connection between the source of the incoming communication and the enterprise-connected mobile device that has an enterprise-assigned number; and
   a DTMF module coupled to the communications platform for generating and transmitting a DTMF message to the enterprise-connected mobile device upon receipt of an incoming communication by the communications platform, the DTMF message containing one of an identifying key and an identifying number depending on whether the source of the incoming communication has an enterprise-assigned number;
   wherein, if the source of the incoming communication has an enterprise-assigned number, the DTMF message transmitted to the mobile device upon receipt of the incoming communication comprises an identifying key that allows look up of the identifying information for the source of the incoming communication in a profile list stored on the mobile device, the profile list comprising a plurality of enterprise-assigned numbers and an identifying information entry for each enterprise-assigned number in the profile list, and
   otherwise, the DTMF message transmitted to the mobile device upon receipt of the incoming communication comprises an identifying number not assigned by the enterprise network for the source of the incoming communication.

2. The system of claim 1, wherein the identifying information entries each comprise one or more of a name, a location, a department, a telephone number and an extension number.

3. The system of claim 1, wherein the DTMF message further comprises a security key used by the mobile device to confirm the origin of the DTMF message.

4. The system of claim 1, wherein the DTMF message is sent to the mobile device only when no data service is available between the system and the mobile device.

5. The system of claim 1, wherein, if DTMF is not available, a manipulated caller identification code is sent to the mobile device when the connection is established.

6. The system of claim 5, wherein the manipulated caller identification code is an automatic number identification (ANI).

7. The system of claim 5, wherein, if the source of the incoming communication has an enterprise-assigned number, the manipulated caller identification code comprises an identifying key corresponding to the key field of the profile list.

8. The system of claim 5, wherein the manipulated caller identification code comprises the identifying information.

9. The system of claim 5, wherein the manipulated caller identification code comprises a number owned by the system used to indicate that the source of the incoming communication does not have an enterprise-assigned number.

10. A method of transmitting identifying information about a source of an incoming communication to a mobile device connected to an enterprise network, the method comprising:
receiving the incoming communication at a communications platform of the enterprise network;
initiating a connection between the source of the incoming communication and the enterprise-connected mobile device that has an enterprise-assigned number; and
generating and transmitting a DTMF message to the enterprise-connected mobile device upon receipt of the incoming communication, the DTMF message containing one of an identifying key and an identifying number depending on whether the source of the incoming communication has an enterprise-assigned number,
wherein, if the source of the incoming communication has an enterprise-assigned number, the DTMF message transmitted to the mobile device upon receipt of the incoming communication comprises an identifying key that allows look up of the identifying information for the source of the incoming communication in a profile list stored on the mobile device, the profile list comprising a plurality of enterprise-assigned numbers and an identifying information entry for each enterprise-assigned number in the profile list, and
otherwise, the DTMF message transmitted to the mobile device upon receipt of the incoming communication comprises an identifying number not assigned by the enterprise network for the source of the incoming communication.

11. The method of claim 10, wherein the identifying information entries each comprise one or more of a name, a location, a department, a telephone number and an extension number.

12. The method of claim 10, wherein the DTMF message further comprises a security key used by the mobile device to confirm the DTMF message as originating from the enterprise network.

13. The method of claim 10, wherein the DTMF message is sent to the mobile device only when no data service is available between the enterprise network and the mobile device.

14. The method of claim 10, wherein, if DTMF is not available, a manipulated caller identification code is sent by the enterprise server to the mobile device when the connection is established.

15. The method of claim 14, wherein the manipulated caller identification code is an automatic number identification (ANI).

16. The method of claim 14, wherein, if the source of the incoming communication has an enterprise-assigned number, the manipulated caller identification code comprises the identifying key corresponding to the key field of the profile list.

17. The method of claim 14, wherein the manipulated caller identification code comprises the identifying information.

18. The method of claim 14, wherein the manipulated caller identification code comprises a number owned by the enterprise network used to indicate that the source of the incoming communication does not have an enterprise-assigned number.

19. A method of displaying identifying information about a source communication device to a user of a mobile device connected to an enterprise network, the method comprising:
receiving a notification of an incoming communication from a communications platform of the enterprise network, the notification comprising a DTMF message transmitted to the enterprise-connected mobile device that has an enterprise-assigned number upon receipt of the incoming communication, the DTMF message containing one of an identifying key and an identifying number depending on whether the source of the incoming communication has an enterprise-assigned number; and
displaying the identifying information on the mobile device by,
wherein, if the source of the incoming communication has an enterprise-assigned number, the DTMF message transmitted to the mobile device upon receipt of the incoming communication comprises an identifying key, looking up the identifying information for the source of the incoming communication in a profile list stored on the mobile device, the profile list comprising a plurality of enterprise-assigned numbers and an identifying information entry for each enterprise-assigned number in the profile list and
otherwise, if the source of the incoming communication has a number that is not enterprise-assigned, displaying the identifying number included in the DTMF message.

20. The method of claim 19, wherein each identifying information entry comprises one or more of a name, a location, a department, a telephone number and an extension number.

21. The method of claim 19, wherein the DTMF message comprises an identifying number for the source communications device and the identifying information is the identifying number.

22. The method of claim 19, wherein the DTMF message comprises a security key used by the mobile device to confirm the DTMF message as originating from the enterprise network.

23. The method of claim 19, wherein the DTMF message is sent to the mobile device only when no data service is available between the enterprise network and the mobile device.

24. The method of claim 19, wherein, if DTMF is not available, a manipulated caller identification code is sent by the enterprise server to the mobile device when a connection is established.

25. The method of claim 24, wherein the manipulated caller identification code is an automatic number identification (ANI).

26. The method of claim 24, wherein the manipulated caller identification code comprises the identifying information.

27. The method of claim 24, wherein, if the source of the incoming communication has an enterprise-assigned number, the manipulated caller identification code comprises an identifying key corresponding to the key field of a profile list.

28. The method of claim 24, wherein the manipulated caller identification code comprises a number owned by the enterprise network used to indicate that the source of the incoming communication does not have an enterprise-assigned number.

* * * * *